US011949182B2

(12) United States Patent
Kim et al.

(10) Patent No.: US 11,949,182 B2
(45) Date of Patent: Apr. 2, 2024

(54) WIRING CONNECTOR ASSEMBLY

(71) Applicants: Hyundai Motor Company, Seoul (KR); Kia Corporation, Seoul (KR); Yura Corporation Co., Ltd., Seongnam-si (KR)

(72) Inventors: Jehyun Kim, Seoul (KR); Hong Jong Baik, Gunpo-si (KR)

(73) Assignees: HYUNDAI MOTOR COMPANY, Seoul (KR); KIA CORPORATION, Seoul (KR); YURA CORPORATION CO., LTD, Seongnam-si (KR)

(*) Notice: Subject to any disclaimer, the term of this patent is extended or adjusted under 35 U.S.C. 154(b) by 324 days.

(21) Appl. No.: 17/468,877

(22) Filed: Sep. 8, 2021

(65) Prior Publication Data

US 2022/0158381 A1 May 19, 2022

(30) Foreign Application Priority Data

Nov. 17, 2020 (KR) ........................ 10-2020-0153723

(51) Int. Cl.
*H01R 13/447* (2006.01)
*H01R 13/193* (2006.01)

(52) U.S. Cl.
CPC ......... *H01R 13/447* (2013.01); *H01R 13/193* (2013.01); *H01R 2201/26* (2013.01)

(58) Field of Classification Search
None
See application file for complete search history.

(56) References Cited

U.S. PATENT DOCUMENTS 3,732,525 A * 5/1973 Henschen .............. H01R 27/00 439/291
4,072,381 A * 2/1978 Burkhart .............. H01R 13/504 439/604
4,483,575 A * 11/1984 Kruger ............... H01R 13/6215 439/367
5,139,431 A * 8/1992 Saitoh ................ H01R 13/6215 439/364
5,328,388 A * 7/1994 Fust ....................... H01R 13/74 439/364
6,095,852 A * 8/2000 Gregory, II .......... H01R 13/518 439/540.1
6,193,531 B1 * 2/2001 Ito .................... H01R 13/62938 439/372

(Continued)

*Primary Examiner* — Krystal Robinson
(74) *Attorney, Agent, or Firm* — SLATER MATSIL, LLP

(57) ABSTRACT

A wiring connector assembly includes a plurality of first connectors to which first wires are connected, a plurality of second connectors to which second wires are connected, the plurality of second connectors configured to be correspondingly connected to the plurality of first connectors, a first protective cover configured to fix the plurality of first connectors by a predetermined spacing and to cover and protect an outside of the plurality of first connectors and the first wires, and a second protective cover configured to fix the plurality of second connectors by a predetermined spacing and to cover and protect an outside of the plurality of second connectors and the second wires, wherein the first protective cover and the second protective cover are configured to be fastened to each other to allow the plurality of first and second connectors to be correspondingly connected to each other.

16 Claims, 8 Drawing Sheets

(56) References Cited

U.S. PATENT DOCUMENTS

| | | | | |
|---|---|---|---|---|
| 6,835,094 | B2 * | 12/2004 | Matsushita | H01R 13/5202 439/271 |
| 7,341,484 | B2 * | 3/2008 | Yamamoto | H01R 13/5202 439/271 |
| 2009/0314511 | A1 * | 12/2009 | Hagi | H01R 9/0512 174/78 |
| 2011/0132638 | A1 * | 6/2011 | Oga | B60R 16/0215 174/135 |
| 2013/0065430 | A1 * | 3/2013 | Adachi | H01R 13/521 439/521 |
| 2013/0264113 | A1 * | 10/2013 | Takata | B60R 16/0215 174/72 A |
| 2016/0236574 | A1 * | 8/2016 | Asai | B60L 53/36 |
| 2022/0368061 | A1 * | 11/2022 | Toyoda | H01R 13/516 |

* cited by examiner

WIRING CONNECTOR ASSEMBLY

CROSS-REFERENCE TO RELATED APPLICATIONS

This application claims the benefit of Korean Patent Application No. 10-2020-0153723, filed on Nov. 17, 2020, in the Korean Intellectual Property Office, which application is incorporated herein by reference.

TECHNICAL FIELD

The disclosure relates to a wiring connector assembly.

BACKGROUND

A wiring connector is a device that connects or separates power or electrical signal wires. Because the wiring connector may connect or separate the wires by fastening or separating first and second connectors to be interconnected, the wiring connector allows various electric components to be easily assembled and allows only a faulty component to be easily removed and replaced when the faulty component is to be repaired.

As the recent trend of vehicles changes to electric vehicles, hydrogen vehicles, autonomous vehicles, etc., the installation of wires to connect electronic components is increasing, and the installation of connectors connecting these wires is also increasing.

However, in these vehicles, because an operator has to install a number of wires in a vehicle body and connect a number of connectors connected to the wires, in a manufacturing process, a lot of work is required and an excessive amount of work time is required. In addition, many wires installed in the vehicle body may be damaged due to interference with other components during an assembly process.

SUMMARY

The disclosure relates to a wiring connector assembly. Particular embodiments relate to a wiring connector assembly capable of fastening a plurality of connectors together by maintaining an accurate spacing therebetween and capable of protecting the plurality of connectors and wires.

An embodiment of the disclosure provides a wiring connector assembly capable of fastening a plurality of connectors together by maintaining an accurate spacing therebetween and capable of protecting the plurality of connectors and wires.

Additional embodiments of the disclosure will be set forth in part in the description which follows and, in part, will be obvious from the description, or may be learned by practice of the disclosure.

In accordance with an embodiment of the disclosure, a wiring connector assembly includes a plurality of first connectors to which first wires are connected, a plurality of second connectors correspondingly connected to the plurality of first connectors and to which second wires are connected, a first protective cover configured to fix the plurality of first connectors by a predetermined spacing and to cover and protect the outside of the plurality of first connectors and the first wires, and a second protective cover configured to fix the plurality of second connectors by a predetermined spacing and to cover and protect the outside of the plurality of second connectors and the second wires, wherein the first protective cover and the second protective cover are fastened to each other, and when fastened, allow the plurality of first connectors and the plurality of second connectors to be correspondingly connected to each other.

The wiring connector assembly may further include a plurality of locking protrusions and a plurality of locking grooves provided at fastening portions of the first protective cover and the second protective cover and correspondingly coupled to each other.

The first protective cover and the second protective cover may be open such that connection portions of the plurality of first connectors and the plurality of second connectors are exposed.

The plurality of first connectors may be arranged side by side at an open end of the first protective cover, and the plurality of second connectors may be arranged side by side at an open end of the second protective cover.

The first protective cover may include a plurality of fixing protrusions provided on an inner surface thereof to fix the plurality of first connectors, and one or more first partition walls interposed between the plurality of first connectors.

The second protective cover may include a plurality of extension parts provided to cover upper and lower surfaces of the plurality of second connectors and having a locking groove coupled to a locking protrusion of the second connector, and one or more second partition walls interposed between the plurality of second connectors.

The first partition wall and the second partition wall may include concave-convex coupling portions correspondingly coupled to each other on surfaces facing each other, respectively.

Each of the plurality of extension parts may have a width corresponding to a width of the second connector and enter the inside of the first connector together with the second connector when the first connector and the second connector are connected.

The first protective cover may include a first upper cover part provided to cover upper sides of the plurality of first connectors and the first wires, and a first lower cover part provided to cover lower sides of the plurality of first connectors and the first wires and to be fastened to the first upper cover part.

The second protective cover may include a second upper cover part provided to cover upper sides of the plurality of second connectors and the second wires, and a second lower cover part provided to cover lower sides of the plurality of second connectors and the second wires and to be fastened to the second upper cover part.

One of the first lower cover part and the second lower cover part may include one or more fixing parts fixed to a center tunnel of a vehicle.

BRIEF DESCRIPTION OF THE DRAWINGS

For a more complete understanding of embodiments of the present invention, and the advantages thereof, reference is now made to the following descriptions taken in conjunction with the accompanying drawings, in which.

DETAILED DESCRIPTION OF ILLUSTRATIVE EMBODIMENTS

Figure 1:
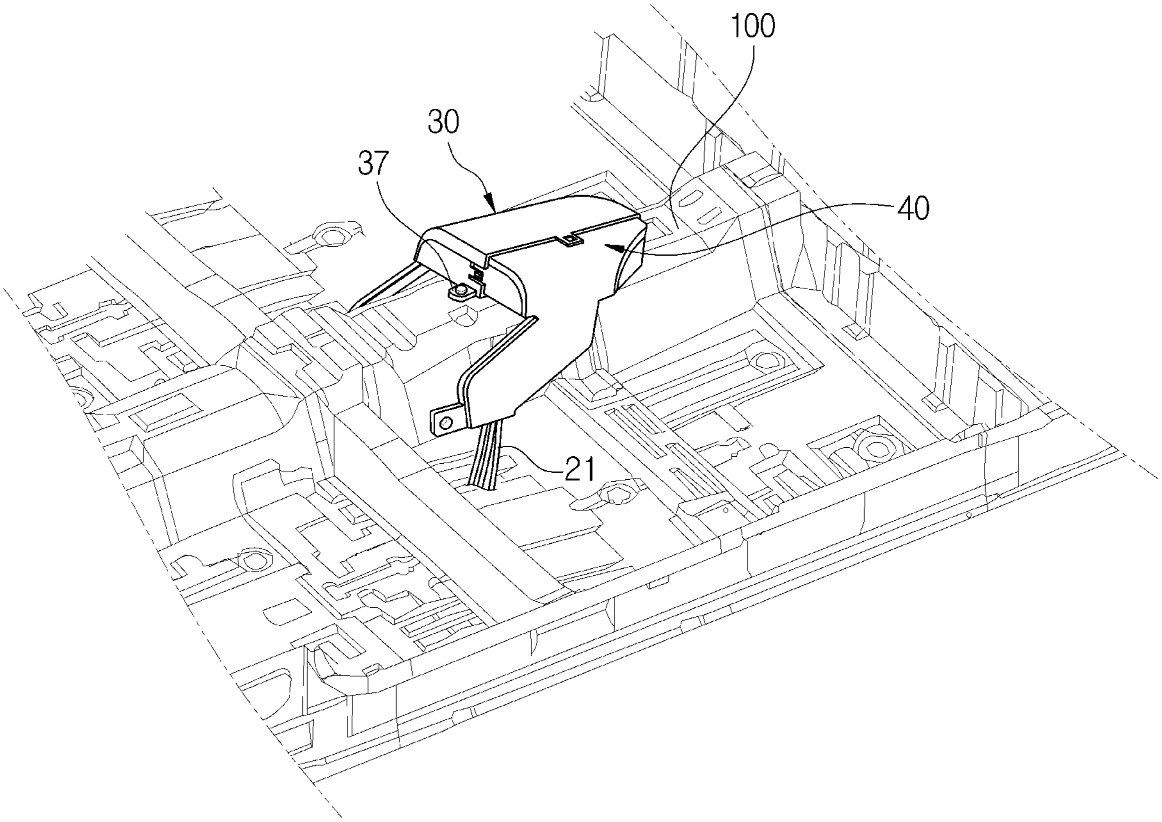
FIG. 1 is a perspective view illustrating a state in which a wiring connector assembly according to an embodiment of the disclosure is mounted in a center tunnel of a vehicle body.
Figure 2:
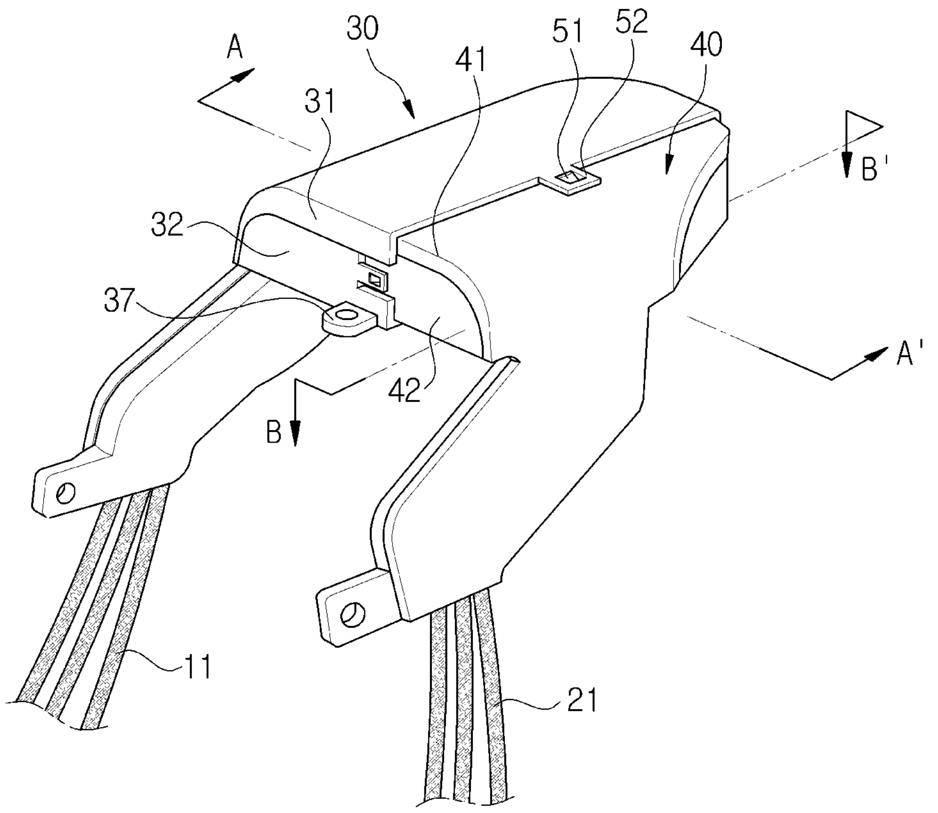
FIG. 2 is a perspective view of the wiring connector assembly according to an embodiment of the disclosure.

Hereinafter embodiments of the disclosure will be described in detail with reference to the accompanying drawings. The embodiments described below are provided by way of example so that those skilled in the art will be able to fully understand the spirit of the disclosure. The disclosure is not limited to the embodiments described below, but may be embodied in other forms. In order to clearly explain the disclosure, parts not related to the description are omitted from the drawings, and the width, length, thickness, etc. of the components may be exaggerated for convenience.

Referring to FIGS. 2 to 5, a wiring connector assembly according to an embodiment of the disclosure may include a plurality of first connectors 10, first wires 11, a plurality of second connectors 20, second wires 21, a first protective cover 30, and a second protective cover 40.

The plurality of first connectors 10 and the plurality of second connectors 20 are correspondingly connected to each other, so that the first wires 11 and the second wires 21 may be electrically connected to each other. The first wires 11 may be connected to electric components on one side of a vehicle or the like, and the second wires 21 may be connected to electric components on the other side of the vehicle or the like.

The plurality of first connectors 10 may be male connectors each including a plurality of male terminals connected to the first wires 11. The plurality of second connectors 20 may be female connectors each including a plurality of female terminals connected to the second wires 21 and connected to the male terminals of the first connectors 10. The present embodiment illustrates a case where the first connector 10 is a male connector and the second connector 20 is a female connector, but the first connector 10 may be a female connector, and the second connector 20 may be a male connector.

Referring to FIGS. 3 to 6, the first protective cover 30 is provided in the form of a duct and may cover and protect the outside of the plurality of first connectors 10 and the first wires 11 by accommodating them. The second protective cover 40 is provided in the form of a duct and may cover and protect the outside of the plurality of second connectors 20 and the second wires 21 by accommodating them.

The first protective cover 30 may include a first upper cover part 31 provided to cover upper sides of the plurality of first connectors 10 and the first wires 11, and a first lower cover part 32 provided to cover lower sides of the plurality of first connectors 10 and the first wires 11 and to be fastened to the first upper cover part 31.

The second protective cover 40 may include a second upper cover part 41 provided to cover upper sides of the plurality of second connectors 20 and the second wires 21, and a second lower cover part 42 provided to cover lower sides of the plurality of second connectors 20 and the second wires 21 and to be fastened to the second upper cover part 41.

Figure 3:
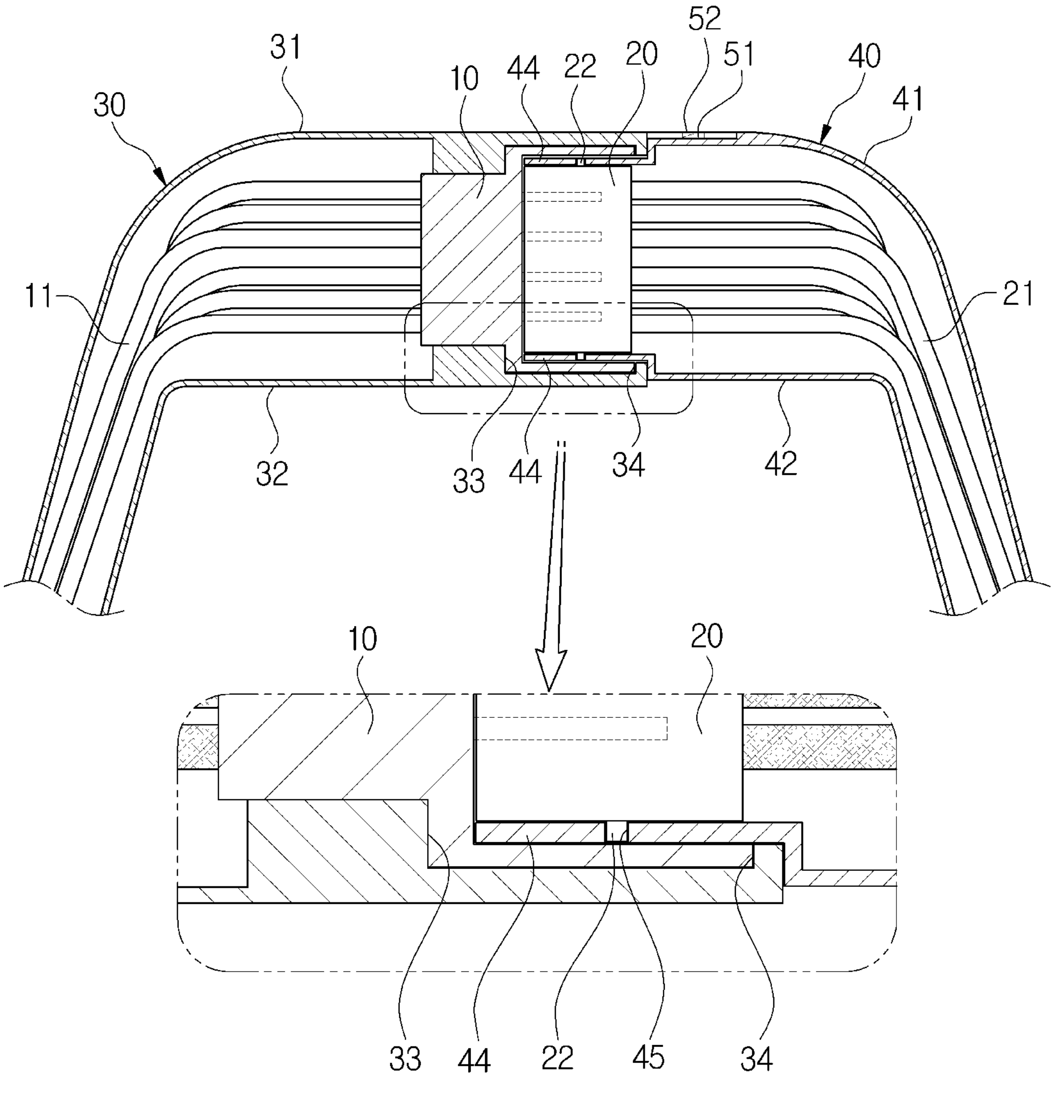
FIG. 3 is a cross-sectional view taken along line A-A' in FIG. 2.
Figure 5:
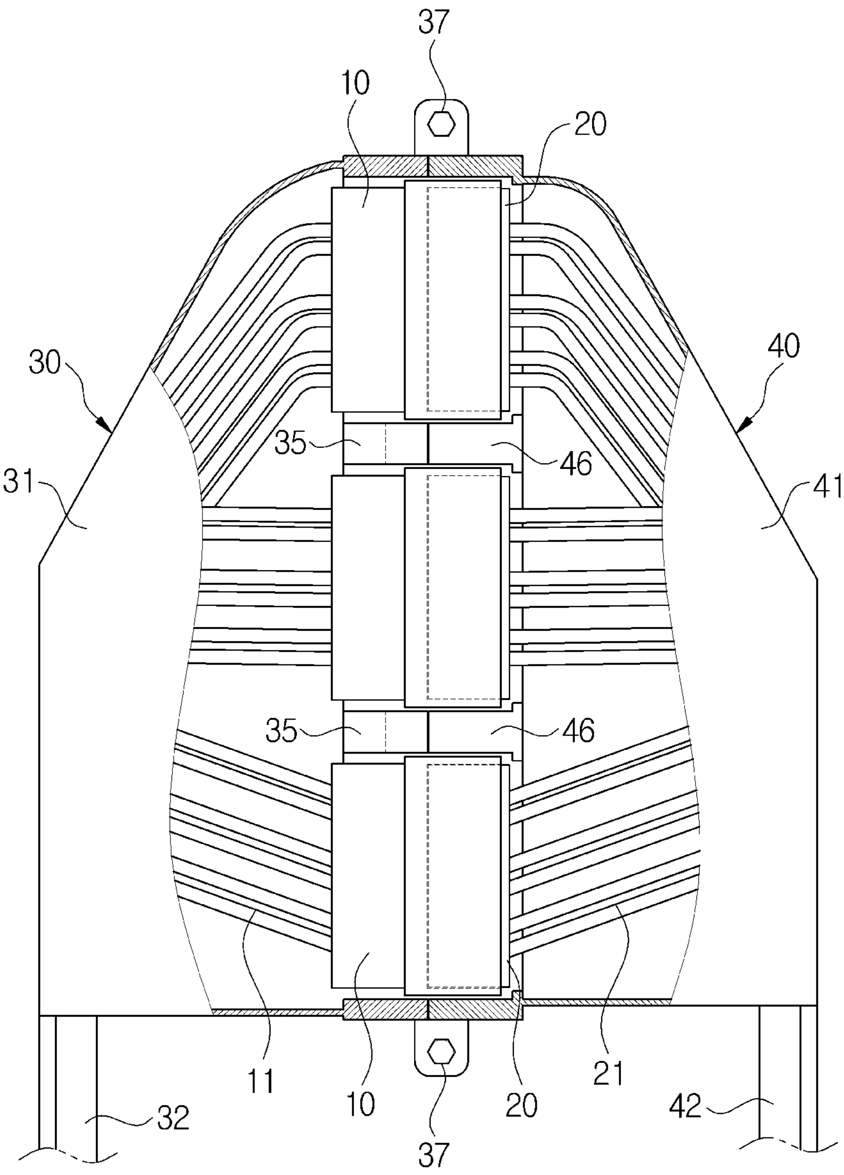
FIG. 5 is a cross-sectional view taken along line B-B' in FIG. 2.

The first protective cover 30 and the second protective cover 40 may be fastened to or separated from each other, and when the first protective cover 30 and the second protective cover 40 are fastened to each other, as illustrated in FIGS. 3 and 5, the plurality of first connectors 10 and the plurality of second connectors 20 may be correspondingly connected to each other.

For such fastening, a plurality of locking protrusions 51 and a plurality of locking grooves 52 that are correspondingly coupled to each other may be provided at fastening portions of the first protective cover 30 and the second protective cover 40. The locking protrusions 51 may be provided to be spaced apart from each other on the first protective cover 30 or the second protective cover 40, and the locking grooves 52 may be provided on the first protective cover 30 or the second protective cover 40 to be correspondingly coupled to the locking protrusions 51 when the first protective cover 30 and the second protective cover 40 are fastened to each other. In the present embodiment, the locking protrusions 51 and the locking grooves 52 may be provided such that upper surfaces and opposite side surfaces of the first protective cover 30 and the second protective cover 40 are coupled to each other.

Ends of the fastening portions of the first protective cover 30 and the second protective cover 40 are open such that connection portions of the plurality of first connectors 10 and the plurality of second connectors 20 are exposed to be connected to each other.

The plurality of first connectors 10 may be arranged side by side at the open end of the first protective cover 30 by a predetermined spacing, the plurality of second connectors 20 may be arranged side by side at the open end of the second protective cover 40 by a predetermined spacing to be correspondingly connected to the first connectors 10.

Figure 4:
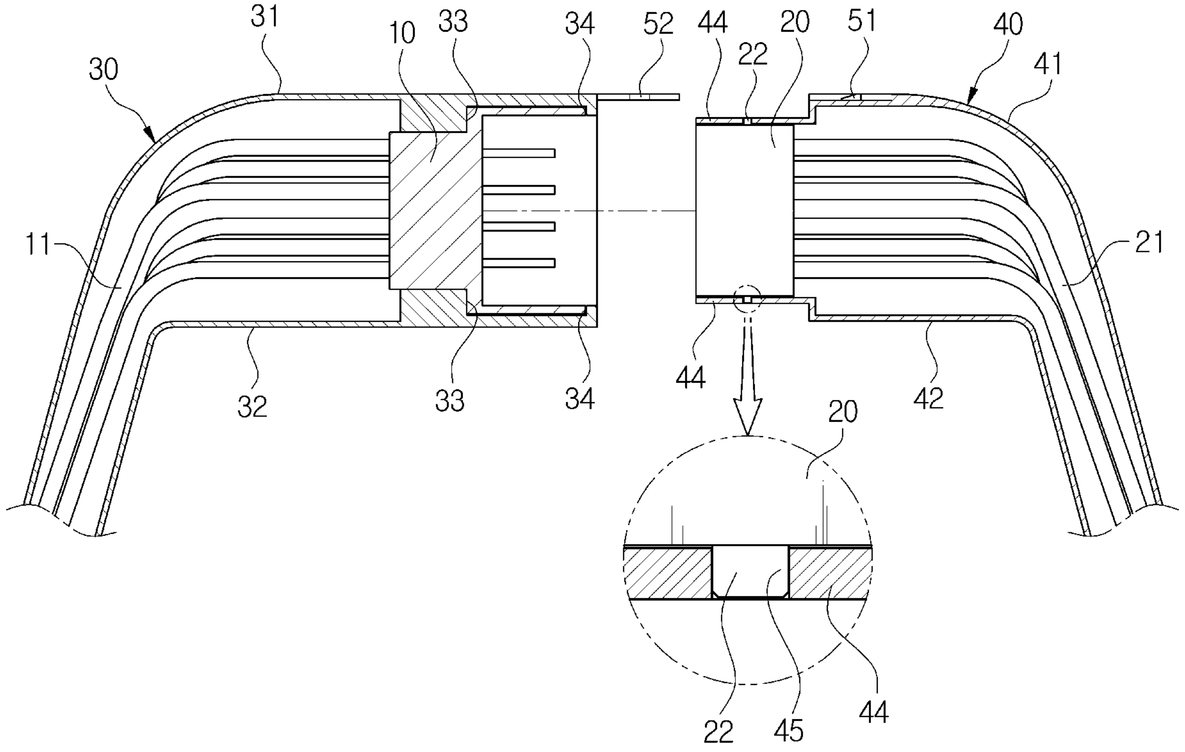
FIG. 4 is a cross-sectional view taken along line A-A' in FIG. 2, illustrating a state in which a first protective cover and a second protective cover are separated.
Figure 6:
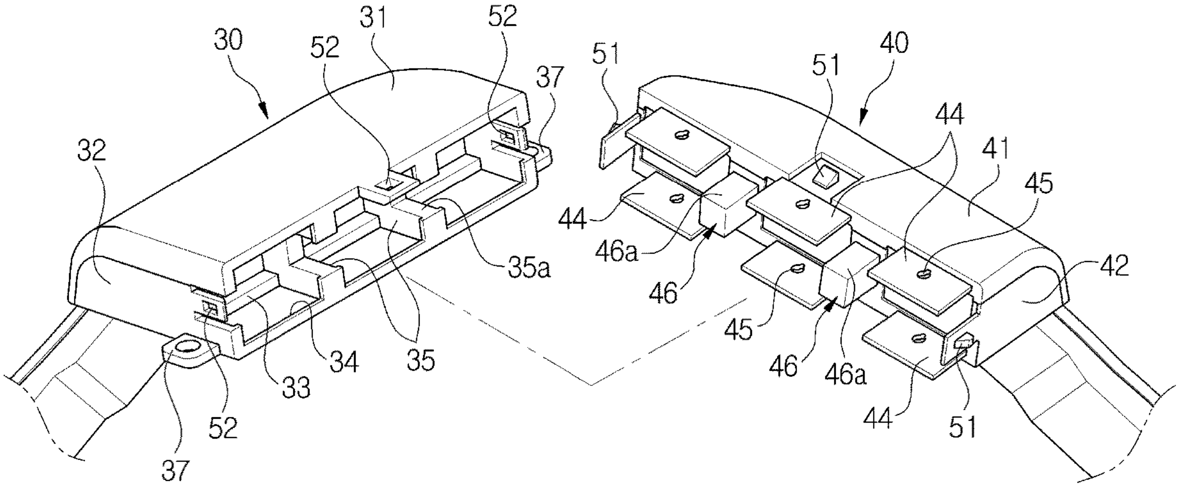
FIG. 6 is a perspective view illustrating a state in which the first protective cover and the second protective cover of the wiring connector assembly according to an embodiment of the disclosure are separated.

Referring to FIGS. 3, 4, and 6, the first protective cover 30 includes a plurality of fixing protrusions 33 and 34 provided on an inner surface thereof to fix the plurality of first connectors 10 to the open end by the predetermined spacing, and a plurality of first partition walls 35 interposed between the plurality of first connectors 10.

The second protective cover 40 includes a plurality of extension parts 44 covering upper and lower surfaces of the plurality of second connectors 20 to fix the plurality of second connectors 20 to the open end by the predetermined spacing and having a locking groove 45 coupled to a locking protrusion 22 of the second connector 20, and a plurality of second partition walls 46 interposed between the plurality of second connectors 20.

Referring to FIGS. 5 and 6, the first partition walls 35 and the second partition walls 46 have concave-convex coupling portions that are correspondingly coupled to each other on surfaces facing each other. For example, a coupling groove **35*a* may be formed on the first partition wall 35, and a coupling protrusion 46*a* correspondingly coupled to the coupling groove 35*a* may be provided on the second partition wall 46. Therefore, the first protective cover 30 and the second protective cover 40** may be firmly coupled to each other without shaking.

Each of the plurality of extension parts 44 provided on the second protective cover 40 has a width of a size corresponding to a width of the second connector 20, and may enter the inside of the first connector 10 together with the second connector 20 when the first connector 10 and the second connector 20 are connected, as illustrated in FIG. 3. Therefore, because each of the extension parts 44 is supported on an inner surface of the first connector 10 by entering the inside of the first connector 10 in a state of fixing the upper and lower surfaces of the second connector 20, the first connector 10 and the second connector 20 may be stably coupled without shaking.

The wiring connector assembly as described above may be used to connect wires installed in a vehicle. As illustrated in FIG. 1, the first protective cover 30 and the second protective cover 40 may be respectively installed to be located on opposite sides of a center tunnel 100 of the vehicle, and may connect the first wires 11 and the second wires 21 on the opposite sides of the center tunnel 100 by mutual fastening. For this installation, the first protective cover 30 and the second protective cover 40 may be bent in a shape corresponding to an outer shape of the center tunnel 100. Of course, the wiring connector assembly of the present embodiment may be applied not only to vehicles but also to other machines or equipment. When applied to other machines or equipment, the shapes of the first protective cover 30 and the second protective cover 40 may be changed to suit the installation environment.

Referring to FIGS. 5 and 6, fixing parts 37 for fixing the first protective cover 30 to the center tunnel 100 of the vehicle may be provided on opposite sides of the first lower cover part 32 of the first protective cover 30. The fixing parts 37 may be provided on the second lower cover part 42 of the second protective cover 40 as necessary.

Hereinafter, a method of installing the wiring connector assembly according to the present embodiment will be described.

Figure 7:
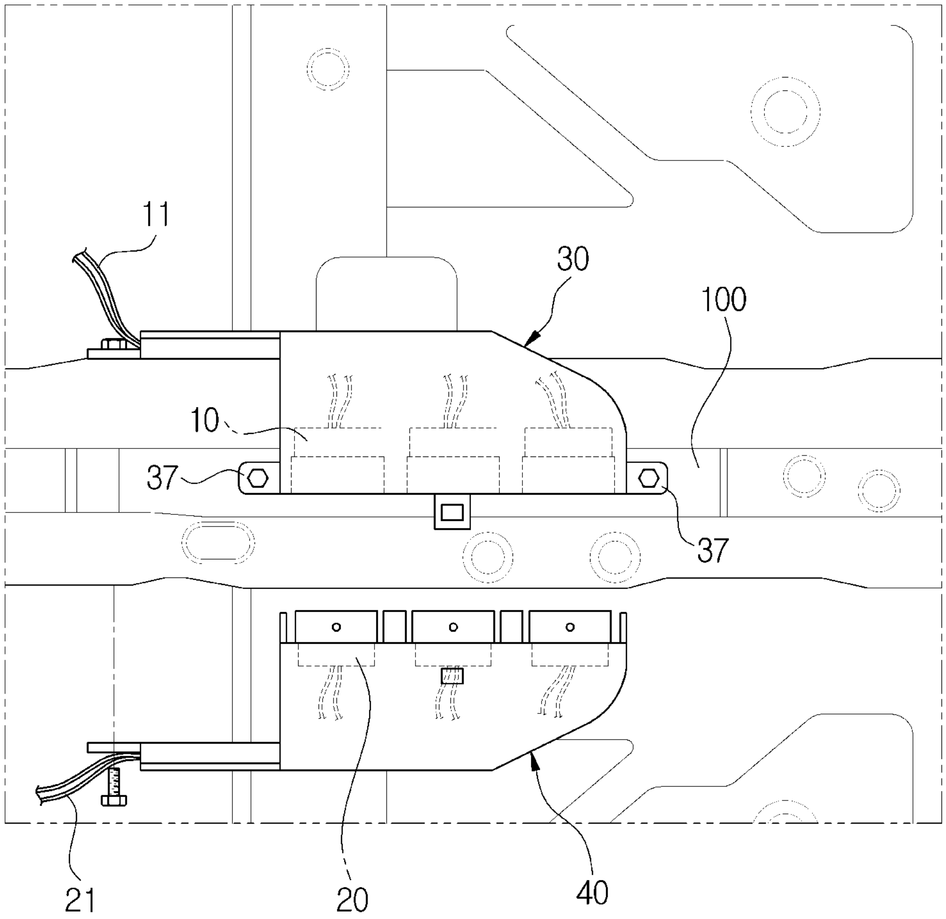
FIGS. 7 and 8 illustrate step by step a process of mounting the wiring connector assembly according to an embodiment of the disclosure to the center tunnel of the vehicle body.

When the wiring connector assembly is installed, as illustrated in FIG. 7, first, the first protective cover 30 on which the first connectors 10 and the first wires 11 are installed may be installed on one side of the center tunnel 100 of the vehicle. In this case, the first protective cover 30 may be fixed to the center tunnel 100 by fastening fixing screws to the fixing palls 37 on the opposite sides of the first lower cover part 32.

Figure 8:
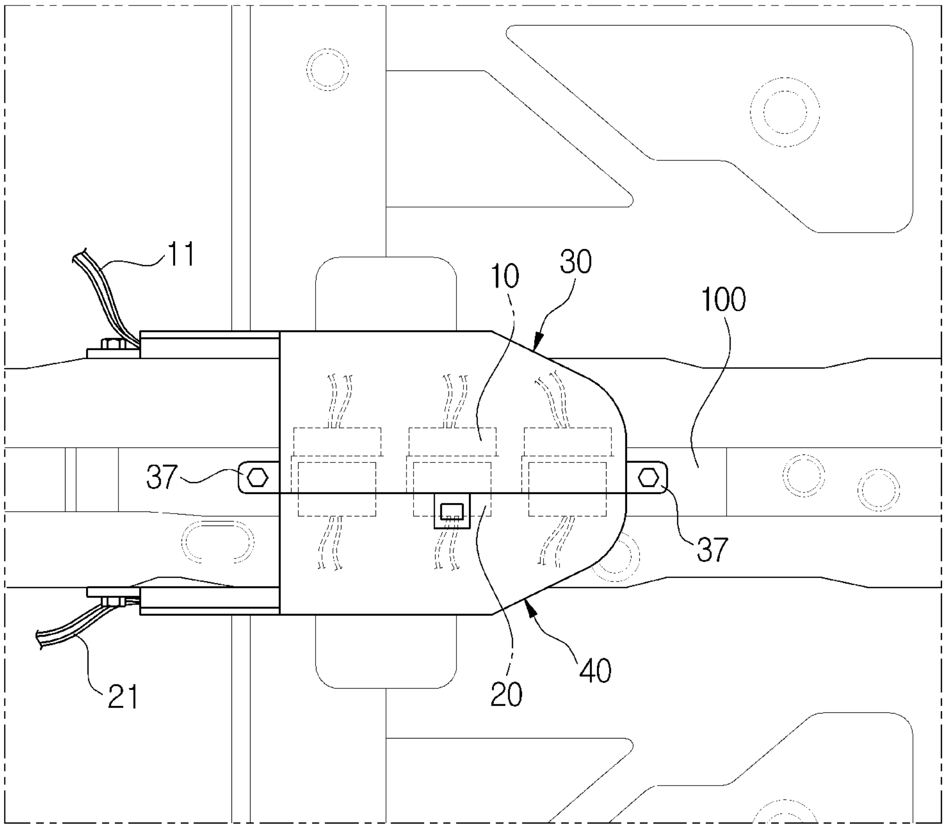

After the first protective cover 30 is installed, as illustrated in FIG. 8, the second protective cover 40 on which the second connectors 20 and the second wires 21 are installed is fastened to the first protective cover 30. Accordingly, the first protective cover 30 and the second protective cover 40 are fastened, and at the same time the plurality of first connectors 10 and the plurality of second connectors 20 may be connected to each other. As an operator checks whether the first protective cover 30 and the second protective cover 40 are correctly connected, whether the first connectors 10 and the second connectors 20 are correctly connected may also be checked.

As such, according to the wiring connector assembly of the present embodiment, the plurality of first connectors 10 and the plurality of second connectors 20 may be fastened to each other in a state of being maintained by an accurate spacing only by fastening the first protective cover 30 and the second protective cover 40. Therefore, when the wiring connector assembly is employed, the amount of work for connecting the connectors in the process of manufacturing a vehicle or the like may be significantly reduced, and the working time may be shortened.

Further, according to the wiring connector assembly of the present embodiment, because the first and second protective covers 30 and 40 cover and protect the first and second connectors 10 and 20 and the first and second wires 11 and 21, the first and second connectors 10 and 20 and the first and second wires 11 and 21 may be prevented from being damaged due to interference with other components in the process of assembling a vehicle or the like.

As is apparent from the above, according to a wiring connector assembly of the present embodiment, a plurality of first connectors and a plurality of second connectors can be fastened to each other in a state of being maintained by an accurate spacing only by fastening a first protective cover and a second protective cover. Therefore, when the wiring connector assembly is employed, the amount of work for connecting the connectors in the process of manufacturing a vehicle or the like can be significantly reduced, and the working time can be shortened.

Further, according to the wiring connector assembly of the present embodiment, because the first and second protective covers cover and protect the first and second connectors and the first and second wires, the first and second connectors and the first and second wires can be prevented from being damaged due to interference with other components in the process of assembling a vehicle or the like.

What is claimed is:

1. A wiring connector assembly comprising:

a plurality of first connectors to which first wires are to be connected;

a plurality of second connectors to which second wires are to be connected, the plurality of second connectors configured to be correspondingly connected to the plurality of first connectors;

a first protective cover configured to fix the plurality of first connectors by a predetermined spacing and to cover and protect an outside of the plurality of first connectors and the first wires; and a second protective cover configured to fix the plurality of second connectors by a predetermined spacing and to cover and protect an outside of the plurality of second connectors and the second wires, wherein:

the first protective cover and the second protective cover are configured to be fastened to each other and, when fastened, allow the plurality of first connectors and the plurality of second connectors to be correspondingly connected to each other, the first protective cover comprises:

a first upper cover part provided to cover upper sides of the plurality of first connectors and the first wires; and a first lower cover part provided to cover lower sides of the plurality of first connectors and the first wires and to be fastened to the first upper cover part, and the second protective cover comprises:

a second upper cover part provided to cover upper sides of the plurality of second connectors and the second wires; and a second lower cover part provided to cover lower sides of the plurality of second connectors and the second wires and to be fastened to the second upper cover part, wherein one of the first lower cover part and the second lower cover part comprises one or more fixing parts fixed to a center tunnel of a vehicle.

2. The wiring connector assembly according to claim 1, further comprising a plurality of locking protrusions and a plurality of locking grooves provided at fastening portions of the first protective cover and the second protective cover and configured to be correspondingly coupled to each other.

3. The wiring connector assembly according to claim 1, wherein the first protective cover and the second protective cover are open such that connection portions of the plurality of first connectors and the plurality of second connectors are exposed.

4. The wiring connector assembly according to claim 3, wherein:

the plurality of first connectors is arranged side by side at an open end of the first protective cover; and the plurality of second connectors is arranged side by side at an open end of the second protective cover.

5. The wiring connector assembly according to claim 4, wherein:

the first protective cover comprises:

a plurality of fixing protrusions provided on an inner surface thereof to fix the plurality of first connectors; and one or more first partition walls interposed between the plurality of first connectors; and the second protective cover comprises:

a plurality of extension parts provided to cover upper and lower surfaces of the plurality of second connectors and having a locking groove coupled to a locking protrusion of the second connectors; and one or more second partition walls interposed between the plurality of second connectors.

6. The wiring connector assembly according to claim 5, wherein the one or more first partition walls and the one or more second partition walls comprise concave-convex coupling portions correspondingly coupled to each other on surfaces facing each other, respectively.

7. The wiring connector assembly according to claim 5, wherein each of the plurality of extension parts has a width corresponding to a width of the second connectors and is configured to enter an inside of the first connectors together with the second connectors when the first connectors and the second connectors are connected.

8. A vehicle comprising:

a vehicle body comprising a center tunnel;

a plurality of first wires disposed in the center tunnel; and a plurality of second wires disposed in the center tunnel;

a wiring connector assembly disposed in the center tunnel to connect the first and second pluralities of wires, the wiring connector assembly comprising:

a plurality of first connectors, the first wires being connected to the plurality of first connectors;

a plurality of second connectors correspondingly connected to the plurality of first connectors, the second wires being connected to the plurality of second connectors;

a first protective cover configured to fix the plurality of first connectors by a predetermined spacing and to cover and protect an outside of the plurality of first connectors and the first wires; and a second protective cover configured to fix the plurality of second connectors by a predetermined spacing and to cover and protect an outside of the plurality of second connectors and the second wires, wherein the first protective cover and the second protective cover are fastened to each other to allow the plurality of first connectors and the plurality of second connectors to be correspondingly connected to each other.

9. The vehicle according to claim 8, further comprising a plurality of locking protrusions and a plurality of locking grooves provided at fastening portions of the first protective cover and the second protective cover and configured to be correspondingly coupled to each other.

10. The vehicle according to claim 8, wherein the first protective cover and the second protective cover are open such that connection portions of the plurality of first connectors and the plurality of second connectors are exposed.

11. The vehicle according to claim 10, wherein:

the plurality of first connectors is arranged side by side at an open end of the first protective cover; and the plurality of second connectors is arranged side by side at an open end of the second protective cover.

12. The vehicle according to claim 11, wherein:

the first protective cover comprises:

a plurality of fixing protrusions provided on an inner surface thereof to fix the plurality of first connectors; and one or more first partition walls interposed between the plurality of first connectors; and the second protective cover comprises:

a plurality of extension parts provided to cover upper and lower surfaces of the plurality of second connectors and having a locking groove coupled to a locking protrusion of the second connectors; and one or more second partition walls interposed between the plurality of second connectors.

13. The vehicle according to claim 12, wherein the one or more first partition walls and the one or more second partition walls comprise concave-convex coupling portions correspondingly coupled to each other on surfaces facing each other, respectively.

14. The vehicle according to claim 12, wherein each of the plurality of extension parts has a width corresponding to a width of the second connectors and is configured to enter an inside of the first connectors together with the second connectors when the first connectors and the second connectors are connected.

15. The vehicle according to claim 8, wherein:

the first protective cover comprises:

a first upper cover part provided to cover upper sides of the plurality of first connectors and the first wires; and a first lower cover part provided to cover lower sides of the plurality of first connectors and the first wires and to be fastened to the first upper cover part; and the second protective cover comprises:

a second upper cover part provided to cover upper sides of the plurality of second connectors and the second wires; and a second lower cover part provided to cover lower sides of the plurality of second connectors and the second wires and to be fastened to the second upper cover part.

16. The vehicle according to claim 15, wherein one of the first lower cover part and the second lower cover part comprises one or more fixing pails fixed to the center tunnel of the vehicle.

* * * * *